US012561066B2

(12) United States Patent
Colella et al.

(10) Patent No.: US 12,561,066 B2
(45) Date of Patent: Feb. 24, 2026

(54) DATA STORAGE DURING POWER STATE TRANSITION OF A MEMORY SYSTEM

(71) Applicant: Micron Technology, Inc., Boise, ID (US)

(72) Inventors: Nicola Colella, Capodrise (IT); Rakeshkumar Dayabhai Vaghasiya, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 171 days.

(21) Appl. No.: 17/872,590

(22) Filed: Jul. 25, 2022

(65) Prior Publication Data

US 2024/0028215 A1     Jan. 25, 2024

(51) Int. Cl.
*G06F 3/06* (2006.01)

(52) U.S. Cl.
CPC .......... *G06F 3/0619* (2013.01); *G06F 3/0604* (2013.01); *G06F 3/0659* (2013.01); *G06F 3/0683* (2013.01)

(58) Field of Classification Search
CPC .... G06F 3/0619; G06F 3/0604; G06F 3/0659; G06F 3/0683; G06F 3/0634; G06F 3/0611; G06F 3/0625
See application file for complete search history.

(56) References Cited

U.S. PATENT DOCUMENTS

| | | | | |
|---|---|---|---|---|
| 9,588,565 B1 * | 3/2017 | Harland | .................. | G06F 11/34 |
| 10,990,526 B1 * | 4/2021 | Lam | ..................... | G06F 12/0246 |
| 11,036,593 B2 * | 6/2021 | Bradshaw | ........... | G06F 11/1469 |

| | | | | |
|---|---|---|---|---|
| 2005/0283648 A1 * | 12/2005 | Ashmore | .............. | G06F 1/3203 |
| | | | | 714/E11.138 |
| 2015/0293714 A1 * | 10/2015 | Matsubara | .............. | G06F 3/065 |
| | | | | 711/162 |
| 2015/0331769 A1 * | 11/2015 | Song | .................... | G06F 11/1441 |
| | | | | 714/6.2 |
| 2017/0242606 A1 * | 8/2017 | Vlaiko | ................ | G06F 13/4282 |
| 2017/0322740 A1 * | 11/2017 | Gabryjelski | ............ | G06F 3/067 |
| 2019/0243759 A1 * | 8/2019 | Stonelake | ............. | G06F 3/0653 |
| 2020/0081830 A1 * | 3/2020 | Desai | .................. | G06F 12/0246 |
| 2020/0348742 A1 * | 11/2020 | Nayak | ..................... | H02J 9/005 |
| 2021/0018975 A1 * | 1/2021 | Liang | ........................ | G06F 1/28 |
| 2021/0304009 A1 * | 9/2021 | Bazarsky | ................. | G06N 3/06 |
| 2022/0066645 A1 * | 3/2022 | Prasad | .................... | G06F 3/061 |
| 2022/0391132 A1 * | 12/2022 | Agarwal | ............ | G06F 12/0895 |

(Continued)

*Primary Examiner* — Rocio Del Mar Perez-Velez

*Assistant Examiner* — Julian S Mendel

(74) *Attorney, Agent, or Firm* — Holland & Hart LLP

(57) ABSTRACT

Methods, systems, and devices for data storage during power state transition of a memory system are described. A memory system may receive a command indicating a transition from a first power state to a second power state or a third power state. Upon receiving the command, the memory system may write a first set of data to a volatile memory of the memory system. For example, the first set of data may be a snapshot or a copy of one or more elements of a second set of data. The memory system may flush the first set of data from the volatile memory to a non-volatile memory of the memory system. The memory system may transition from the first power state to the second power state or the third power state and read the snapshot from the volatile memory or the non-volatile memory upon transitioning back to the first power state.

16 Claims, 6 Drawing Sheets

(56) References Cited

U.S. PATENT DOCUMENTS

| | | | | |
|---|---|---|---|---|
| 2023/0089489 A1* | 3/2023 | Otani | .................... | G06F 3/0625 |
| | | | | 711/154 |
| 2023/0138586 A1* | 5/2023 | Hong | .................... | G06F 3/0673 |
| | | | | 711/162 |

* cited by examiner

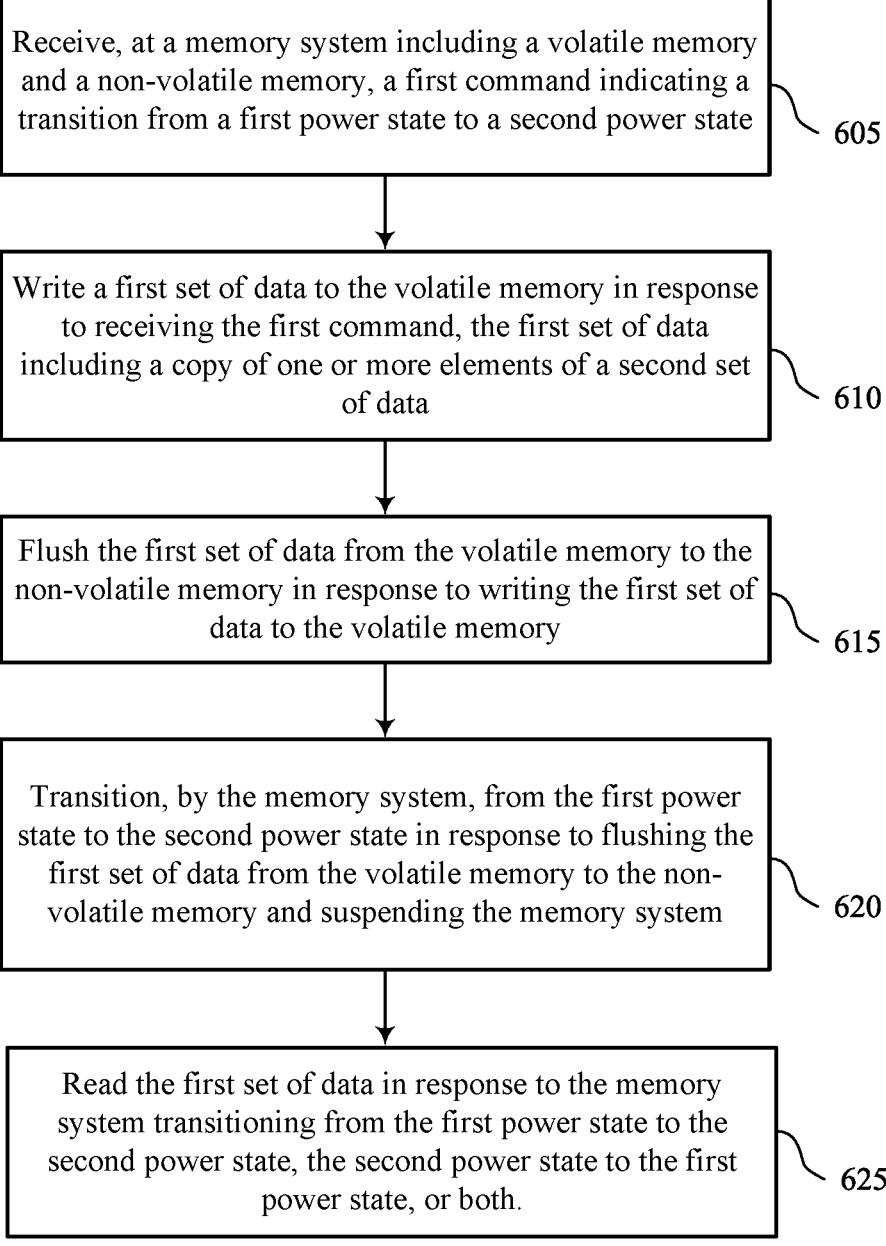

Receive, at a memory system including a volatile memory and a non-volatile memory, a first command indicating a transition from a first power state to a second power state

605

Write a first set of data to the volatile memory in response to receiving the first command, the first set of data including a copy of one or more elements of a second set of data

610

Flush the first set of data from the volatile memory to the non-volatile memory in response to writing the first set of data to the volatile memory

615

Transition, by the memory system, from the first power state to the second power state in response to flushing the first set of data from the volatile memory to the non-volatile memory and suspending the memory system

620

Read the first set of data in response to the memory system transitioning from the first power state to the second power state, the second power state to the first power state, or both.

DATA STORAGE DURING POWER STATE TRANSITION OF A MEMORY SYSTEM

FIELD OF TECHNOLOGY

The following relates to one or more systems for memory, including data storage during power state transition of a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 6 shows a flowchart illustrating a method or methods that support data storage during power state transition of a memory system in accordance with examples as disclosed herein.

DETAILED DESCRIPTION

Figure 1:
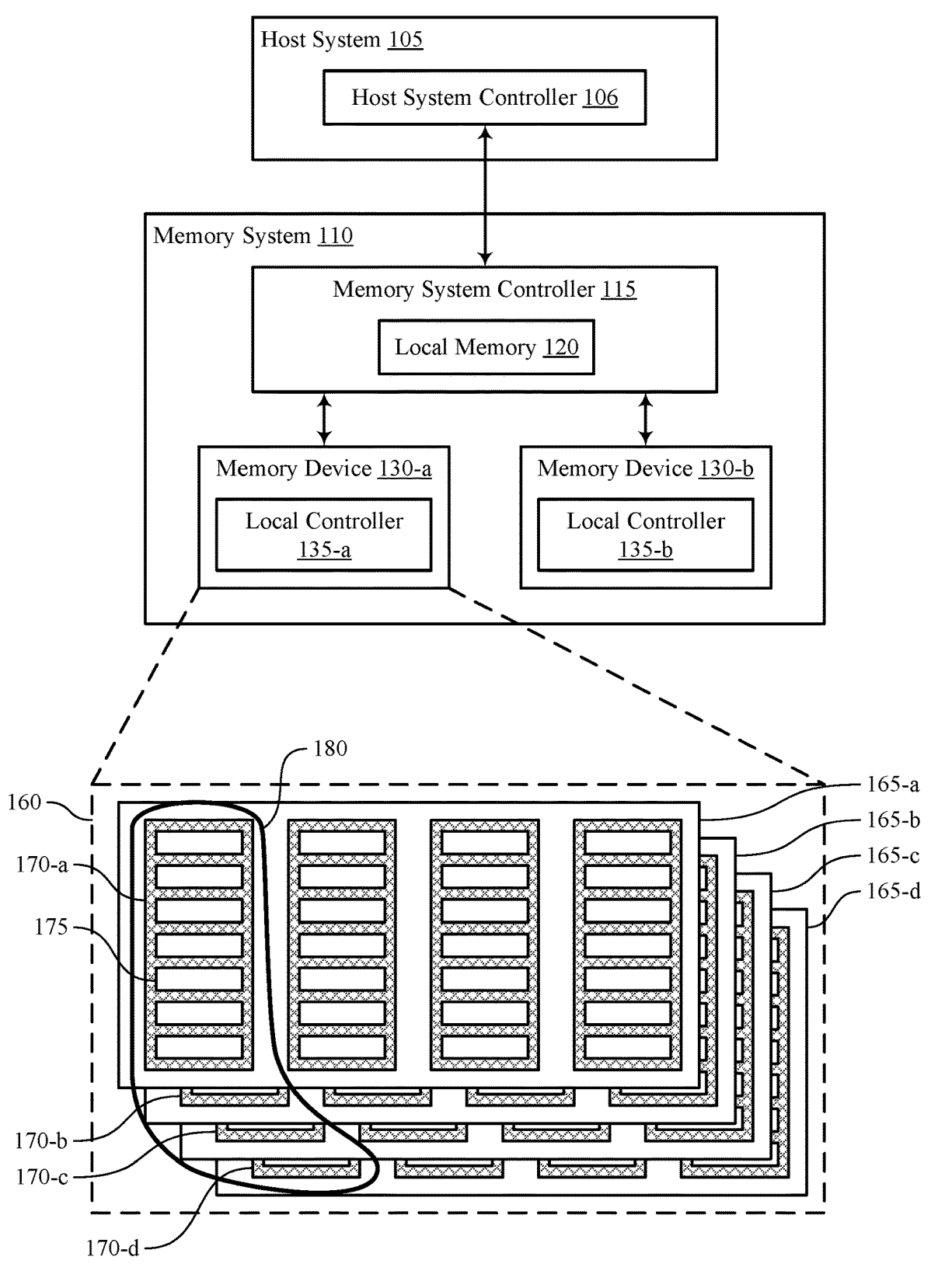
FIG. 1 illustrates an example of a system that supports data storage during power state transition of a memory system in accordance with examples as disclosed herein.

In some memory systems, such as managed NAND (MNAND) systems, it may be desirable to save one or more operational parameters or data elements in advance of a power down event. For example, a memory system may read and copy one or more data values of a changelog (e.g., a list of chronological changes or operations that have been performed) to preserve the memory system in its most recent state. To read and copy the values, the memory system may execute multiple read requests, merge requests, and flush requests during a power down process in order to save values from the changelog to volatile memory. However, the process of reading and copying the values into volatile memory may introduce unwanted latency during a power down and reduce quality of service (QoS) of the memory system. Further, during full power down events, data values stored in the volatile memory may be lost, and the memory system may not be able to operate upon powering back up.

In accordance with the techniques described herein, a memory system may implement techniques for saving (e.g., storing) one or more operational parameters or data elements in advance of a power down event. To improve the speed of a power down process and to reduce overall latency, a memory system may write a snapshot of a changelog to volatile memory, and flush the snapshot to non-volatile memory with fewer overall read and copy operations as traditional memory systems. For example, if the system loses partial power (e.g., is suspended), the memory system can read the snapshot data from the volatile memory upon resuming the system. Alternatively, if the system completely loses power, the memory system may read the snapshot data from the non-volatile memory upon rebooting the system. Thus, the snapshot data may be preserved and accessed with less latency in the event of a partial power down or a full power down.

To store snapshot data, the memory system may receive, from a host system, a command indicating a power down event. The command may indicate that the memory system will transition from a power on state (e.g., a normal power state) to a reduced-power state (e.g., a full power down, a partial power down, a suspend power down, or the like). The memory system may create a snapshot (e.g., a copy) of one or more operational parameters and may write a copy of the operational parameters to volatile memory. The memory system may move (e.g., flush, transfer) the snapshot data from the volatile memory to the non-volatile memory in advance of transitioning power states.

In some cases, the memory system may receive a second command indicating a power up event, such as a transition from the reduced-power state to the normal power state. Upon transitioning power states, the memory system may read the snapshot data from the volatile memory or the non-volatile memory. For example, if the reduced-power state was a full power down (e.g., a power cycle), the memory system may read the snapshot from the non-volatile memory, as the snapshot data may no longer be stored to the volatile memory (e.g., due to its volatile nature). Alternatively, if the reduced-power state was a partial power down (e.g., if the memory system was suspended), the memory system may read the snapshot from the volatile memory. The memory system may then update one or more operational parameters of the memory system using one or more elements of the snapshot data. By using snapshot data as described herein, the memory system may save time and power by performing fewer operations prior to power down, among other advantages.

Figure 2:
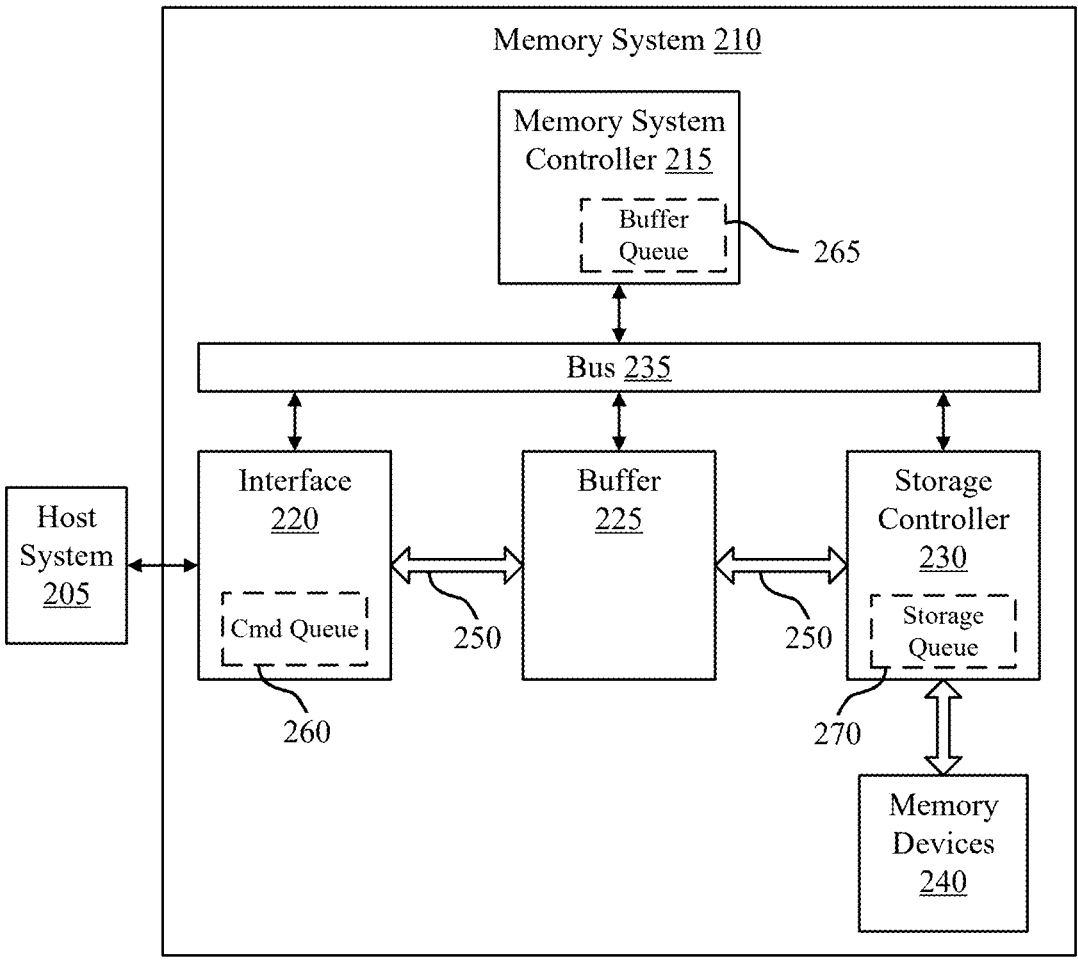
FIG. 2 illustrates an example of a system that supports data storage during power state transition of a memory system in accordance with examples as disclosed herein.
Figure 2:

Features of the disclosure are initially described in the context of systems, devices, and circuits with reference to FIGS. 1 and 2. Features of the disclosure are described in the context of a system and a process flow diagram with reference to FIGS. 3 and 4. These and other features of the disclosure are further illustrated by and described in the context of an apparatus diagram and flowchart that relate to data storage during power state transition of a memory system with reference to FIGS. 5 and 6.

FIG. 1 illustrates an example of a system 100 that supports data storage during power state transition of a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR)

interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support data storage during power state transition of a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, the memory system 110 may receive, from the host system 105, a command indicating a power down event. For example, the command may indicate to or trigger the memory system 110 to transition from a power on state to a reduced-power state (e.g., a full power down, a partial power down, a suspend power down, or the like). Upon beginning to transition power states, the memory system controller 115 may create a snapshot of one or more operational parameters of the memory system 110. For example, the memory system controller 115 may write a copy one or more elements of a set of data to a volatile memory (e.g., of memory device 130-b) based on receiving the command.

The memory system controller 115 may flush the snapshot from the volatile memory to the non-volatile memory (e.g., of memory device 130-a) prior to transitioning power states. For example, flushing the snapshot may include reading (e.g., copying) the snapshot data from the volatile memory (e.g., from the memory device 130-b) and moving (e.g., transferring) the data to the non-volatile memory (e.g., to the memory device 130-a). Upon flushing the data, a copy of the data may be stored to both memories (e.g., to both the volatile memory and the non-volatile memory). In some cases, after the flushing is complete and memory system 110 has transitioned power states, the memory system 110 may receive a second command indicating a power up event. For example, the second command may indicate to or trigger the memory system 110 to transition from the reduced-power state to the power on state (e.g., to a normal power state).

Upon transitioning power states for a second time, the memory system controller 115 may read the snapshot data from the volatile memory (e.g., from the memory device 130-b) or from the non-volatile memory (e.g., from the memory device 130-a). For example, if the memory system 110 transitions from a power off state (e.g., if the memory system 110 power cycles), the memory system controller 115 may read the snapshot data from the non-volatile memory. In other examples, if the memory system 110 transitions from a reduced-power state other than a power off state, the memory system controller 115 may read the snapshot data from the volatile memory to improve read speeds. The memory system controller 115 may update one or more operational parameters using one or more elements of the snapshot data before resuming operation. By using snapshot data as described herein, the memory system 110 may save time and power by performing fewer operations prior to power down, among other advantages.

FIG. 2 illustrates an example of a system 200 that supports data storage during power state transition of a memory system in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on the communication from the interface 220. In some cases, the memory system controller 215 may determine that the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory system 210 (e.g., to the memory devices 240).

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine whether the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine whether the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some cases, the memory system 210 may receive, from the host system 205, a command indicating a power down event. For example, the command may indicate to or trigger the memory system 210 to transition from a power on state to a reduced-power state (e.g., a full power down, a partial power down, a suspend power down, or the like). Upon beginning to transition power states, the memory system controller 215 may create a snapshot of one or more operational parameters of the memory system 210. For example, the memory system controller 215 may write a copy one or more elements of a set of data to a volatile memory (e.g., to a memory device 240 that includes volatile memory) based on receiving the command.

The memory system controller 215 may flush the snapshot from the volatile memory to a non-volatile memory (e.g., to a memory device 240 that includes non-volatile memory) prior to transitioning power states. For example, flushing the snapshot may include reading (e.g., copying) the snapshot data from the volatile memory and moving (e.g., transferring) the data to the non-volatile memory. Upon flushing the data, a copy of the data may be stored to both memories (e.g., to both the volatile memory and the non-volatile memory). In some cases, after the flushing is complete and memory system 210 has transitioned power states, the memory system 210 may receive a second command indicating a power up event. For example, the second command may indicate to or trigger the memory system 210 to transition from the reduced-power state to the power on state (e.g., to a normal power state).

Upon transitioning power states for a second time, the memory system controller 215 may read the snapshot data from the volatile memory or from the non-volatile memory. For example, if the memory system 210 transitions from a power off state, the memory system controller 215 may read the snapshot data from the non-volatile memory. In other examples, if the memory system 210 transitions from a reduced-power state other than a power off state, the memory system controller 215 may read the snapshot data from the volatile memory to improve read speeds. The memory system controller 215 may update one or more operational parameters using one or more elements of the snapshot data before resuming operation. By using snapshot data as described herein, the memory system 210 may save time and power by performing fewer operations prior to power down, among other advantages.

Figure 3:
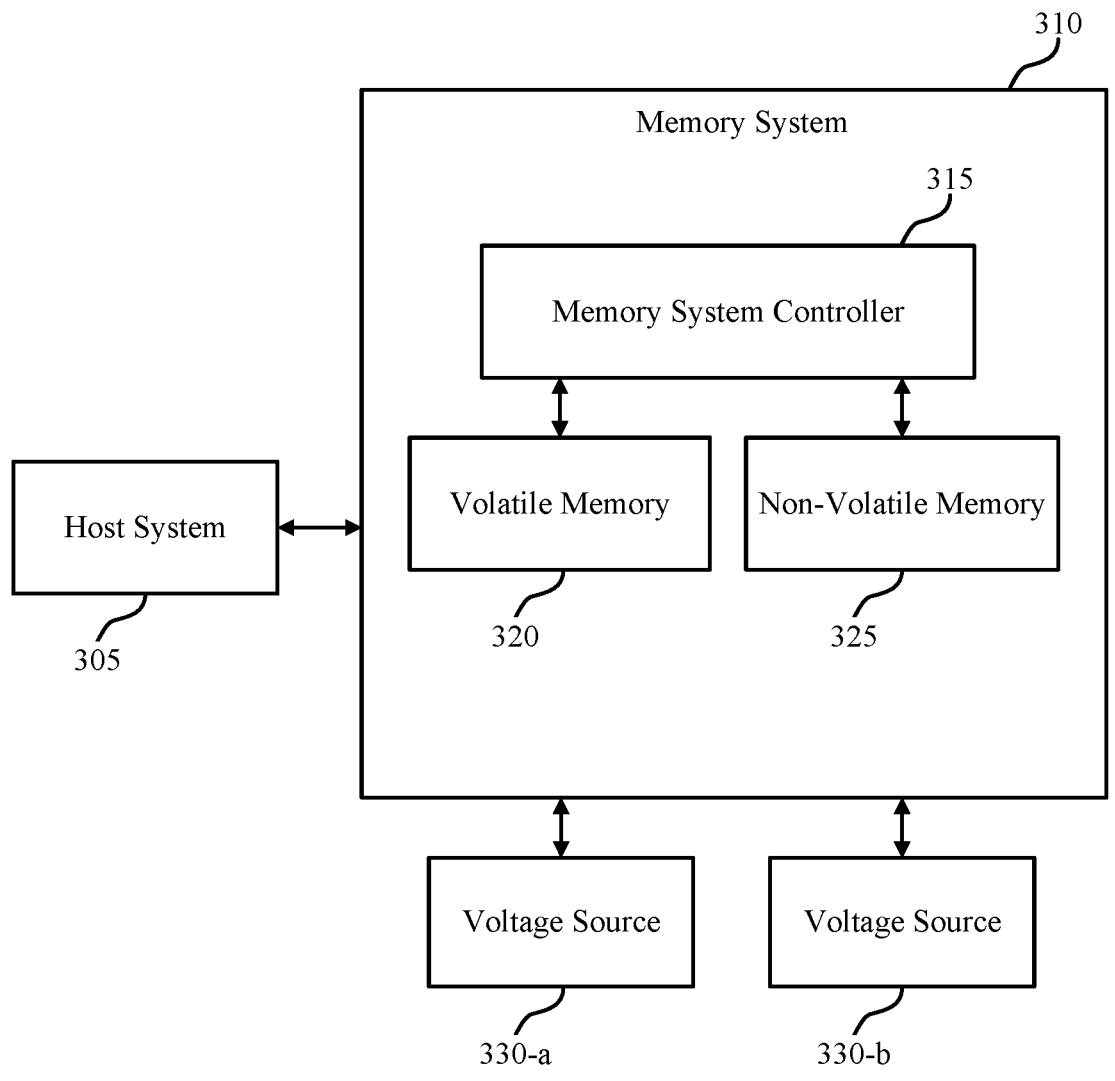
FIG. 3 illustrates an example of a system that supports data storage during power state transition of a memory system in accordance with examples as disclosed herein.

FIG. 3 illustrates example of a system 300 that supports data storage during power state transition of a memory system in accordance with examples as disclosed herein. The system 300 may include a memory system 310 configured to perform access operations, such as read or write operations, store data, or some combination thereof. The memory system 310 may be an example of the corresponding devices as described with reference to FIGS. 1 and 2. In some cases, the memory system 310 may include a memory system controller 315 coupled with a volatile memory 320, a non-volatile memory 325 (e.g., NAND), or both. In some examples, the volatile memory may be used for retention (e.g., retention memory) and may include one or more types of volatile memory cells (e.g., SRAM, DRAM, VRAM, or the like). The memory system 310 may be coupled with a host system 305 that may be an example of the corresponding devices as described with reference to FIGS. 1 and 2.

The memory system 310 may operate in a variety of power states, including a power on state (e.g., a normal power state, a first power state), a power off state (e.g., a second power state), and a reduced-power state (e.g., partial power down state, a suspended power down state, a third power state). In a power on state, the memory system 310 may be connected to or coupled with multiple voltage sources 330. For example, the memory system 310 may be connected to a first power supply and a second power supply. In some examples, the first power supply may be the voltage source 330-*a* (e.g., a first supply voltage, such as VCC) and the second power supply may be the voltage source 330-*b* (e.g., a second voltage supply, such as VCCQ). In a reduced-power state, one or more of the voltage sources 330 may be disabled or the memory system 310 may otherwise be disconnected from one or more of the voltage sources 330 (e.g., via a switch or other hardware component). For example, the first voltage source 330-*a* may be disabled while the second voltage source 330-*b* is connected and enabled. Alternatively, the first voltage source 330-*b* may be disabled while the second voltage source 330-*a* is connected and enabled. In a power off state, the memory system 310 may be disconnected from all of the voltage sources 330. For example, the first voltage source 330-*a* and the voltage source 330-*b* may be concurrently disabled.

To transition power states, the memory system 310 may receive, from the host system 305, a command (e.g., a power off notification (PON) or a system setup utility (SSU) request). In some cases, the command may be transmitted by the host system 305 to indicate a power down event, trigger a power down process, or both. Upon receiving the command, the memory system 310 may write, copy, or otherwise save one or more data elements of the memory system 310 (e.g., a system data structure) to prevent data loss during the power down event. In some cases, the command may trigger the power down event, such as a transition from a first power state (e.g., a power on state) to a second power state (e.g., a power off state), or from the first power state to a third power state (e.g., a reduced-power state). In some cases, the command may indicate which of the voltage sources 330 may be disabled by the memory system 310, based on the desired power state.

In some cases, the memory system 310 may include a changelog for storing data associated with updating one or more logical-to-physical (L2P) or other aspects of the memory system 310. For example, for each operation initiated by the host system 305, data associated with the operation may be chronologically recorded in the changelog. In some examples, the memory system 310 may include a foreground (FG) changelog and a background (BG) changelog. For example, the FG changelog may be used for updating entries in a L2P table associated with new commands (e.g., new write commands) and the BG changelog may be used for updating and merging existing entries in the L2P table.

Prior to receiving the command to transition power states, the memory system controller 315 may have been performing or tasked with performing one or more operations (write tasks, error tasks, BG changelog tasks, GC operations, L2P updates, or some combination thereof). That is, upon receiving the command, the memory system controller 315 may be performing one or more ongoing operations or one or more operations may be queued (e.g., scheduled to be performed by the memory system controller 315). For example, the memory system controller 315 may execute or manage operations such as access operations, wear-leveling operations, garbage collection operations, error control operations such as error-detecting operations or error-correcting operations, encryption operations, caching operations, media management operations, background refresh, health monitoring, and address translations between LBAs associated with commands from the host system 305 and physical addresses (e.g., physical block addresses) associated the non-volatile memory 325.

The memory system 310 may wait for the completion of any ongoing or queued operations before copying or writing the snapshot data. In some cases, the memory system controller 315 may send an indication to the host system 305 indicating that the memory system 310 will transition to the desired power state upon completion of the ongoing tasks. Based on the indication, the host system 305 may suspend sending new commands to the memory system 310 for a duration (e.g., until the memory system 310 transitions back to a normal power state).

After any ongoing or queued operations are completed, the memory system controller 315 may create a snapshot and write the snapshot to the volatile memory 320. As described herein, the snapshot may include a backup or a copy of one or more operational parameters or trim settings of the memory system 310. For example, the snapshot may include a copy of one or more elements of data, including one or more mapping tables (e.g., mapping information that associates logical addresses with physical locations of stored data within the non-volatile memory 325), an FG changelog, one or more parity bits (e.g., parity bits associated with an error control code, such as a redundant array of independent NAND (RAIN) configuration), or a combination thereof.

Based on writing the snapshot to the volatile memory 320, the memory system may flush the snapshot from the volatile memory 320 to the non-volatile memory 325. For example, flushing the snapshot data may include reading the snapshot data from the volatile memory 320 and writing the data to the non-volatile memory 325. Upon flushing the data, a copy of the data may be stored at both the volatile memory 320 and the non-volatile memory 325. In some cases, in addition to flushing the snapshot data, the memory system 310 may flush data associated with tasks that are relatively less time consuming to the non-volatile memory 325. For example, in case of a full power down event (e.g., a power cycle), it may be advantageous to save such additional data to the non-volatile memory 325 to prevent any unnecessary data losses.

After flushing the snapshot data to the non-volatile memory 325, the memory system 310 may fully transition power states. For example, the memory system 310 may transition from the first power state to the second power state or to the third power state. As described herein, the first power state may be a power on state (e.g., a normal power state) and may be a relatively higher power state than the second and third power states. The second power state may be a full power down state (e.g., a power-off state), such as a full power cycle, and may be a relatively lower power state than the first and third power state. Additionally or alternatively, the third power state may be a partial power down state, such as a suspend mode or a sleep mode, and may be a relatively lower power state than the first power state, but may be a relatively higher power state than the second power state.

To transition from the first power state to the second power state, the memory system 310 may disable (e.g., temporarily disable) at least the first power supply (e.g., voltage source 330-*a*) and the second power supply (e.g., voltage source 330-*b*) associated with the memory system 310. Thus, in some examples, while operating in the second power state, all voltage sources 330 associated with the memory system 310 may be disabled. In a full power down state, data (e.g., the snapshot data) stored at the volatile memory 320 may not be retained due to the volatile nature of the memory cells. However, the data stored to the non-volatile memory 325 may be retained.

Additionally or alternatively, if transitioning from the first power state to the third power state, the memory system 310 may disable at least one power supply (e.g., voltage source 330-*a* (VCC)) associated with the memory system 310, while the other power supply (e.g., voltage source 330-*b* (VCCQ)) remains enabled. Thus, in a reduced-power state, the data (e.g., the snapshot data) stored at both the volatile memory 320 and at the non-volatile memory 325 may be retained due to the memory system 310 not completely losing power. In some cases, the memory system 310 may transition to a specific power state (e.g., to the second power state or to the third power state) the based on the command. For example, the command may include a bit value, a flag, or the like, indicating a desired power state for the memory system 310 to transition to.

After transitioning to the desired power state (e.g., the second power state or the third power state), the memory system 310 may receive a second command from the host system 305. The second command may indicate a power up event, such as a transition from the current power state back to the first power state. Accordingly, the memory system 310 may transition from the second power state to the first power state or from the third power state to the first power state. In other examples, the memory system 310 may transition back to the first power state without receiving a command. For example, during a restart, the memory system 310 may transition from a power on state to a power off state, and then transition (e.g., automatically transition) back to a power on state.

Upon transitioning back to the first power state, the memory system controller 315 may read the snapshot of data from a specific memory type (e.g., the volatile memory 325 or the non-volatile memory 320). For example, if the memory system 310 transitions from the first power state to the second power state during the power down event, and a full power cycle occurs, the memory system controller 315 may attempt to read the snapshot data from the volatile memory 320. Due to its volatile nature, the snapshot data may no longer be stored to the volatile memory 320 in the event of a full power cycle. Accordingly, the memory system controller 315 may be unsuccessful in reading the snapshot data from the volatile memory 320 and thus may then attempt to read the snapshot data from the non-volatile memory 325.

Because the non-volatile memory 325 may retain the snapshot data in the event of a power cycle, the memory system controller 315 may successfully read the snapshot data from the non-volatile memory 325. In other examples, if a power cycle occurs (e.g., if the memory system 310 transitions from the second power state to the first power state), the memory system controller 315 may attempt to read the snapshot data from the non-volatile memory 325 without attempting to read the snapshot data from the volatile memory 320. For example, the memory system 310 may determine whether (e.g., that) the power down event included a transition to a full power down state, and that the volatile memory 320 may have lost the snapshot data. Based on this determination, the memory system controller 315 may read the snapshot data from the non-volatile memory 325 without of attempting to read the snapshot data from the volatile memory 320.

Additionally or alternatively, if the memory system 310 transitioned from the first power state to the third power state, upon transitioning back to the first power state, the memory system controller 315 may read the snapshot data from either the volatile memory 320 or the non-volatile memory 325. Because the volatile memory 320 and the non-volatile memory 325 may both retain the snapshot data while in the third power state, reading the snapshot data from either memory may be successful upon transitioning back to the first power state. In some cases, as a matter of design choice, the memory system controller 315 may read the snapshot data from the volatile memory 320. That is, because reading data from the volatile memory 320 may be relatively faster than reading data from the non-volatile memory 325, it may be beneficial or advantageous to read the snapshot data from the volatile memory 320 to improve the overall performance of the memory system 310.

As described herein, the memory system 310 may use one or more operational parameters to operate correctly. In some cases, however, the operational parameters of the memory system 310 may be stored in volatile memory 320 and thus lost during the power down event. Thus, upon powering back on after a power down event, the memory system 310 may update (e.g., restore) the operational parameters to their original state (e.g., to the state prior to the memory system 310 transitioning power states). Because the snapshot data may include such operational parameters, reading the snapshot data from the volatile memory 320 or the volatile memory 325 may ensure that the operational parameters of the memory system 310 are restored and that the memory system 310 is otherwise operating properly.

Upon transitioning back to the first power state and updating its operational parameters, the memory system 310 may resume normal operations. For example, the memory system 310 may perform operations such as read operations, write operations, garbage collection, or the like. By using a snapshot as described herein, the memory system 310 may save time and power by performing fewer operations prior to power down. Further, if the memory system 310 loses power entirely, the memory system may read the snapshot data from non-volatile memory 325 to avoid losing critical data if transitioning power states. Likewise, if the system loses partial power, the memory system 310 may read the snapshot data from the volatile memory 320, which may improve the latency of the memory system 310 upon transitioning back to a normal power state, among other advantages.

Figure 4:
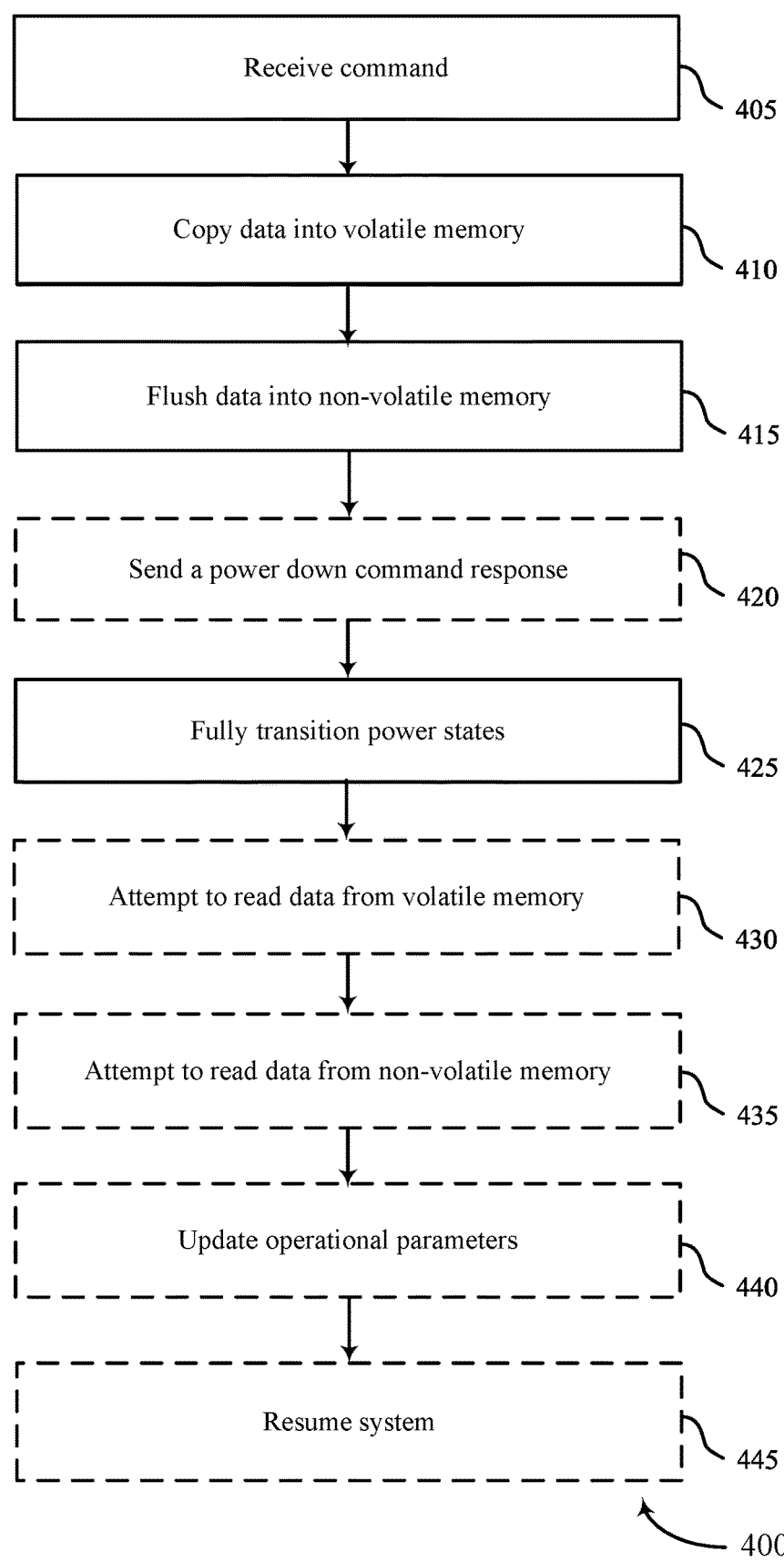
FIG. 4 illustrates an example of a process flow diagram that supports data storage during power state transition of a memory system in accordance with examples as disclosed herein.

FIG. 4 illustrates an example of a process flow diagram 400 that supports data storage during power state transition of a memory system in accordance with examples as disclosed herein. The process flow diagram 400 may include one or more operations of a memory system. For example, the memory system may be an example of memory system 110, 210, or 310 as described with reference to FIGS. 1-3. Aspects of the process flow diagram 400 may be implemented by a memory system controller, among other components. Additionally or alternatively, aspects of the process flow diagram 400 may be implemented as instructions stored in memory (e.g., firmware stored in a memory). For example, the instructions, when executed by a controller (e.g., a memory system controller) may cause the controller to perform the operations of the process flow diagram 400.

At 405, a command may be received. For example, the memory system may receive, from a host system, a command (e.g., a PON or an SSU request) indicating a transition from a first power state to a second power state or a third power state. As described herein, the first power state may be a power on state, the second power state may be a power off state (e.g., a power cycle), and the third power state may be a reduced-power state (e.g., a partial power down, a suspended power down). In some cases, the command may indicate that one or more power supplies coupled with the memory system may be turned off, disconnected, disabled, or some combination thereof. For example, the command may indicate to disable a first power supply (e.g., VCC), a second power supply (e.g., VCCQ), or both.

At 410, data may be copied into a volatile memory. For example, the memory system may copy data into a volatile memory of the memory system. In some cases, the copy may be a snapshot of one or more data structures of the memory system. For example, the snapshot may include a copy of one or more elements of data, including one or more mapping tables (e.g., mapping information that associates logical addresses with physical locations of stored data within the non-volatile memory array), an FG changelog, one or more parity bits (e.g., RAIN parity bits), or a combination thereof. In some examples, the one or more elements of data may be selected based on associated tasks or activities. For example, the snapshot may include one or more data elements associated with relatively time consuming activities.

At 415, the data may be flushed from the volatile memory to the non-volatile memory. For example, after on copying the data to the volatile memory, the memory system may flush the data from the volatile memory to a non-volatile memory of the memory system. For example, flushing the data may include reading the snapshot data from the volatile memory and writing the data to the non-volatile memory. As described herein, upon flushing the snapshot data, the snapshot data may be stored to both the volatile and non-volatile memories. In some cases, in addition to flushing the snapshot data, the memory system may flush data associated with tasks that are relatively less time consuming to the non-volatile memory.

At 420, a response to the command may be sent. For example, the memory system may send, to a host system, a response to the power down command. The response may include an acknowledgement (e.g., an ACK) or a negative acknowledgement (e.g., a NACK) regarding whether the memory system successfully initiated transitioning power states.

At 425, the memory system may transition power states. For example, after the snapshot data has been flushed to the non-volatile memory, the memory system may fully transition power states. For example, the memory system may transition from the first power state (e.g., a power on state) to the second power state (e.g., a power off state) or a third power state (e.g., a reduced-power state). Depending on whether the memory system transitions to the second power state or the third power state, the memory system may disable one or more voltage sources (e.g., VCC, VCCQ, or both).

After transitioning power states, the memory system may remain in the second power state or the third power state for a duration. After the duration, the memory system may receive a command from the host system to transition back to the first power state (e.g., the power on state). For example, if the memory system transitioned from the first power state to the second power state, the memory system may transition from the second power state to the first power state during. Alternatively, if the memory system transitioned from the first power state to the third power state during, the memory system may transition from the third power state to the first power state.

At 430, the snapshot data may be attempted to be read from the volatile memory. For example, upon transitioning back to the first power state, the memory system may attempt to read the snapshot from the volatile memory. For example, if the memory system previously transitioned from the first power state to the second power state, the snapshot data may no longer be stored to the volatile memory, and the memory system may thus be unable to read the snapshot data from the volatile memory. In other examples, if the memory system previously transitioned from the first power state to the third power state, the snapshot data may be stored to the volatile memory, and the memory system may be able to read the snapshot data from the volatile memory.

At 435, the snapshot data may be attempted to be read from the non-volatile memory. For example, the memory system may attempt to read the snapshot data from the non-volatile memory. For example, if the memory system previously transitioned from the first power state to the second power state, and the snapshot data stored in the volatile memory is lost, the memory system may read the snapshot data from the non-volatile memory. That is, in such instances where the volatile memory loses power, the memory system may unsuccessfully read the snapshot data from the volatile memory, but may successfully read the snapshot data from the non-volatile memory. Additionally or alternatively, if the memory system previously transitioned from the first power state to the third power state, the snapshot data stored to the volatile memory and the non-volatile memory may be retained. In such examples, while it may be preferable to read the snapshot data from the volatile memory due to the improved read speed, the memory system may read the snapshot data from the non-volatile memory based on a pre-configuration or an indication from the host system.

At 440, one or more operational parameters may be updated using the snapshot data. For example, the memory system may update one or more operational parameters of the memory system using the snapshot data read from the volatile memory or the non-volatile memory. Upon updating the operational parameters, the memory system may be configured in a same or similar manner as it was prior to receiving the command (e.g., the PON command at 405).

At 445, the memory system may resume operations after transitioning back to the first power state, updating the operational parameters, or both. For example, upon transitioning back to the first power state, the memory system controller may be able to perform operations such as read operations, write operations, garbage collection, and the like. By using a snapshot as described herein, the memory system may save time and power by performing fewer operations prior to power down. Further, if the memory system loses power entirely, the memory system may read the snapshot data from non-volatile memory to avoid losing critical data when transitioning power states. Likewise, if the system loses partial power, the memory system may read the snapshot data from the volatile memory, which may improve the latency of the memory system upon transitioning back to a normal power state, among other advantages.

Figure 5:
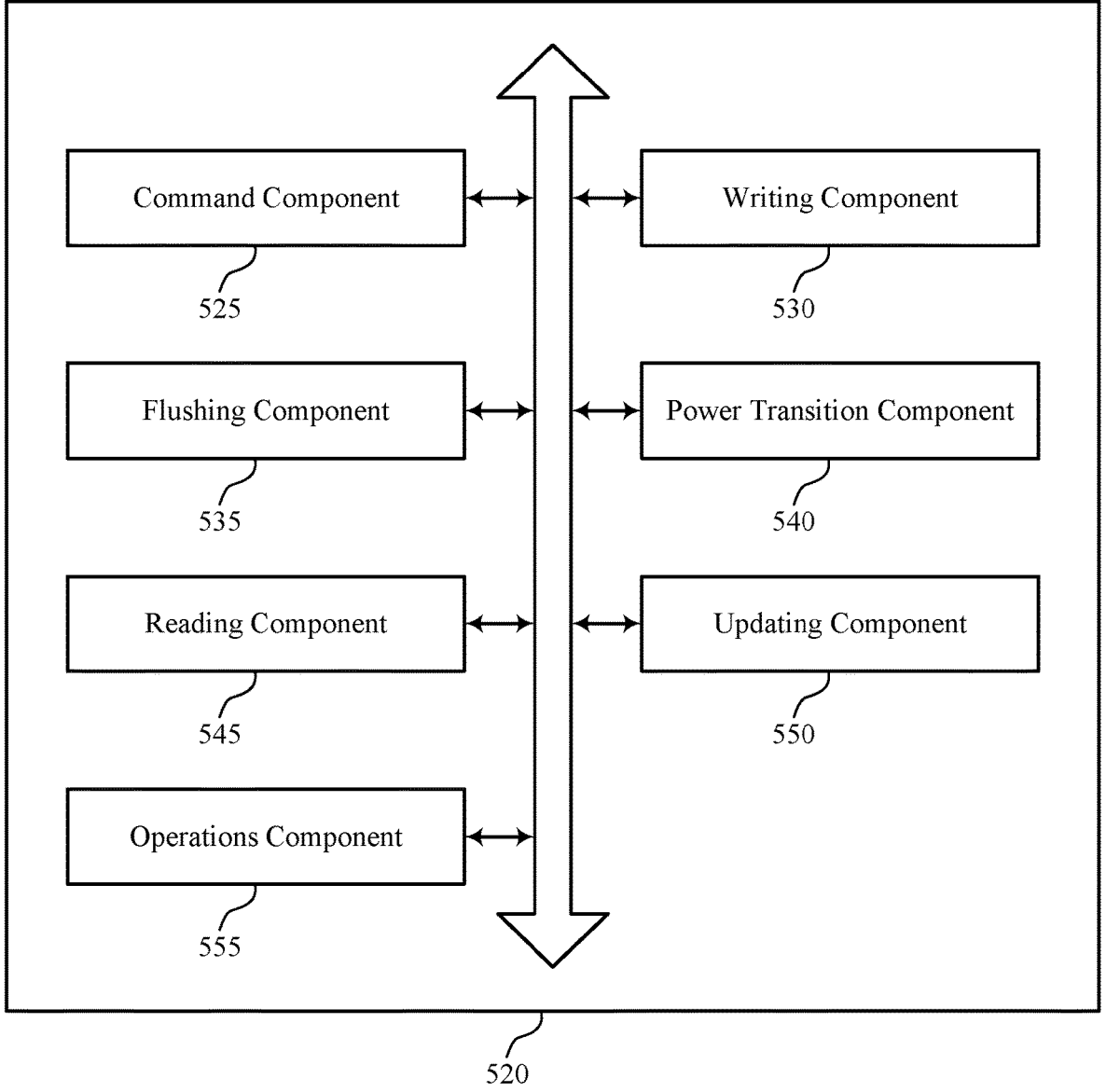
FIG. 5 shows a block diagram of a memory system that supports data storage during power state transition of a memory system in accordance with examples as disclosed herein.

FIG. 5 shows a block diagram 500 of a memory system 520 that supports data storage during power state transition of a memory system in accordance with examples as disclosed herein. The memory system 520 may be an example of aspects of a memory system as described with reference to FIGS. 1 through 4. The memory system 520, or various components thereof, may be an example of means for performing various aspects of data storage during power state transition of a memory system as described herein. For example, the memory system 520 may include a command component 525, a writing component 530, a flushing component 535, a power transition component 540, a reading component 545, an updating component 550, an operations component 555, or any combination thereof. Each of these components may communicate, directly or indirectly, with one another (e.g., via one or more buses).

The command component 525 may be configured as or otherwise support a means for receiving, at a memory system including a volatile memory and a non-volatile memory, a first command indicating a transition from a first power state to a second power state. The writing component 530 may be configured as or otherwise support a means for writing a first set of data to the volatile memory based at least in part on receiving the first command, the first set of data including a copy of one or more elements of a second set of data. The flushing component 535 may be configured as or otherwise support a means for flushing the first set of data from the volatile memory to the non-volatile memory based at least in part on writing the first set of data to the volatile memory. The power transition component 540 may be configured as or otherwise support a means for transitioning, by the memory system, from the first power state to the second power state based at least in part on flushing the first set of data from the volatile memory to the non-volatile memory and suspending the memory system. The reading component 545 may be configured as or otherwise support a means for reading the first set of data based at least in part on the memory system transitioning from the first power state to the second power state.

In some examples, the power transition component 540 may be configured as or otherwise support a means for transitioning, by the memory system, from the second power state to the first power state based at least in part on transitioning from the first power state to the second power state. In some examples, the reading component 545 may be configured as or otherwise support a means for reading the first set of data from the non-volatile memory based at least in part on the memory system transitioning from the second power state to the first power state, where the second power state includes a lower power state than the first power state and a third power state.

In some examples, the reading component 545 may be configured as or otherwise support a means for attempting to read the first set of data from the volatile memory based at least in part on the memory system transitioning from the second power state to the first power state, where reading the first set of data from the non-volatile memory is based at least in part on attempting to read the first set of data from the volatile memory.

In some examples, to support transitioning from the first power state to the second power state, the power transition component 540 may be configured as or otherwise support a means for disabling, by the memory system, at least the first power supply and the second power supply associated with the memory system.

In some examples, the power transition component 540 may be configured as or otherwise support a means for transitioning, by the memory system, from the second power state to the first power state based at least in part on transitioning from the first power state to the second power state. In some examples, the reading component 545 may be configured as or otherwise support a means for reading the first set of data from the volatile memory based at least in part on the memory system transitioning from the second power state to the first power state, where the second power state includes a lower power state than the first power state and a higher power state than a third power state.

In some examples, to support transitioning from the first power state to the second power state, the power transition component 540 may be configured as or otherwise support a means for disabling, by the memory system, at least the first power supply associated with the memory system.

In some examples, the second set of data includes one or more operational parameters of the memory system, and the updating component 550 may be configured as or otherwise support a means for updating the one or more operational parameters of the memory system using the first set of data based at least in part on reading the first set of data.

In some examples, the operations component 555 may be configured as or otherwise support a means for performing, for a first duration, one or more operations at the memory system after receiving the first command, where writing the first set of data to the volatile memory occurs during a second duration after the first duration.

In some examples, the command component 525 may be configured as or otherwise support a means for receiving, from the memory system, a second command indicating a transition from the second power state to the first power state. In some examples, the power transition component 540 may be configured as or otherwise support a means for transitioning, by the memory system, from the second power state to the first power state based at least in part on receiving the second command, where reading the first set of data is based at least in part on the memory system transitioning from the second power state to the first power state.

In some examples, the second set of data includes at least one or more mapping tables, one or more changelogs, one or more sets of parity bits, or a combination thereof.

FIG. 6 shows a flowchart illustrating a method 600 that supports data storage during power state transition of a memory system in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, at a memory system including a volatile memory and a non-volatile memory, a first command indicating a transition from a first power state to a second power state. The operations of 605 may be performed in accordance with examples as disclosed herein. In some examples, aspects of the operations of 605 may be performed by a command component 525 as described with reference to FIG. 5.

At 610, the method may include writing a first set of data to the volatile memory based at least in part on receiving the first command, the first set of data including a copy of one or more elements of a second set of data. The operations of 610 may be performed in accordance with examples as disclosed herein. In some examples, aspects of the operations of 610 may be performed by a writing component 530 as described with reference to FIG. 5.

At 615, the method may include flushing the first set of data from the volatile memory to the non-volatile memory based at least in part on writing the first set of data to the volatile memory. The operations of 615 may be performed in accordance with examples as disclosed herein. In some examples, aspects of the operations of 615 may be performed by a flushing component 535 as described with reference to FIG. 5.

At 620, the method may include transitioning, by the memory system, from the first power state to the second power state based at least in part on flushing the first set of data from the volatile memory to the non-volatile memory and suspending the memory system. The operations of 620 may be performed in accordance with examples as disclosed herein. In some examples, aspects of the operations of 620 may be performed by a power transition component 540 as described with reference to FIG. 5.

At 625, the method may include reading the first set of data based at least in part on the memory system transitioning from the first power state to the second power state. Additionally or alternatively, the method may include reading the first set of data based at least in part on the memory system transitioning from the second power state to the first power state. The operations of 625 may be performed in accordance with examples as disclosed herein. In some examples, aspects of the operations of 625 may be performed by a reading component 545 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system including a volatile memory and a non-volatile memory, a first command indicating a transition from a first power state to a second power state; writing a first set of data to the volatile memory based at least in part on receiving the first command, the first set of data including a copy of one or more elements of a second set of data; flushing the first set of data from the volatile memory to the non-volatile memory based at least in part on writing the first set of data to the volatile memory; transitioning, by the memory system, from the first power state to the second power state based at least in part on flushing the first set of data from the volatile memory to the non-volatile memory and suspending the memory system; and reading the first set of data based at least in part on the memory system transitioning from the first power state to the second power state.

Aspect 2: The method, apparatus, or non-transitory computer-readable medium of aspect 1, further including operations, features, circuitry, logic, means, or instructions, or any combination thereof for transitioning, by the memory system, from the second power state to the first power state based at least in part on transitioning from the first power state to the second power state and reading the first set of data from the non-volatile memory based at least in part on the memory system transitioning from the second power state to the first power state, where the second power state includes a lower power state than the first power state and a third power state.

Aspect 3: The method, apparatus, or non-transitory computer-readable medium of aspect 2, further including operations, features, circuitry, logic, means, or instructions, or any combination thereof for attempting to read the first set of data from the volatile memory based at least in part on the memory system transitioning from the second power state to the first power state, where reading the first set of data from the non-volatile memory is based at least in part on attempting to read the first set of data from the volatile memory.

Aspect 4: The method, apparatus, or non-transitory computer-readable medium of any of aspects 2 through 3 where transitioning from the first power state to the second power state includes operations, features, circuitry, logic, means, or instructions, or any combination thereof for disabling, by the memory system, at least the first power supply and the second power supply associated with the memory system.

Aspect 5: The method, apparatus, or non-transitory computer-readable medium of any of aspects 1 through 4, further including operations, features, circuitry, logic, means, or instructions, or any combination thereof for transitioning, by the memory system, from the second power state to the first power state based at least in part on transitioning from the first power state to the second power state and reading the first set of data from the volatile memory based at least in part on the memory system transitioning from the second power state to the first power state, where the second power state includes a lower power state than the first power state and a higher power state than a third power state.

Aspect 6: The method, apparatus, or non-transitory computer-readable medium of aspect 5 where transitioning from the first power state to the second power state includes operations, features, circuitry, logic, means, or instructions, or any combination thereof for disabling, by the memory system, at least the first power supply associated with the memory system.

Aspect 7: The method, apparatus, or non-transitory computer-readable medium of any of aspects 1 through 6 where the second set of data includes one or more operational parameters of the memory system and the method, apparatuses, and non-transitory computer-readable medium, further includes operations, features, circuitry, logic, means, or instructions, or any combination thereof for updating the one or more operational parameters of the memory system using the first set of data based at least in part on reading the first set of data.

Aspect 8: The method, apparatus, or non-transitory computer-readable medium of any of aspects 1 through 7, further including operations, features, circuitry, logic, means, or instructions, or any combination thereof for performing, for a first duration, one or more operations at the memory system after receiving the first command, where writing the first set of data to the volatile memory occurs during a second duration after the first duration.

Aspect 9: The method, apparatus, or non-transitory computer-readable medium of any of aspects 1 through 8, further including operations, features, circuitry, logic, means, or instructions, or any combination thereof for receiving, from the memory system, a second command indicating a transition from the second power state to the first power state and transitioning, by the memory system, from the second power state to the first power state based at least in part on receiving the second command, where reading the first set of data is based at least in part on the memory system transitioning from the second power state to the first power state.

Aspect 10: The method, apparatus, or non-transitory computer-readable medium of any of aspects 1 through 9 where the second set of data includes at least one or more mapping tables, one or more changelogs, one or more sets of parity bits, or a combination thereof.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory system comprising a volatile memory and a non-volatile memory; and
a controller coupled with the memory system and configured to cause the apparatus to:
receive a first command indicating a transition of the volatile memory and the non-volatile memory from a first power state to a second power state, wherein the second power state is lower than the first power state and lower than a third power state;
copy, to the volatile memory and in response to receiving the first command, a first set of data that is stored at the memory system and associated with trim settings of the memory system;
flush the first set of data from the volatile memory to the non-volatile memory in response to copying the first set of data to the volatile memory;
transition the volatile memory and the non-volatile memory from the first power state to the second power state in response to flushing the first set of data from the volatile memory to the non-volatile memory;
transition the volatile memory and the non-volatile memory from the second power state to the first power state after transitioning the volatile memory and the non-volatile memory from the first power state to the second power state;
attempt to read the first set of data associated with the trim settings of the memory system from the volatile memory after transitioning the volatile memory and the non-volatile memory from the second power state to the first power state and before reading the first set of data from the non-volatile memory; and
read the first set of data from the non-volatile memory in response to transitioning the volatile memory and the non-volatile memory from the second power state to the first power state and attempting to read the first set of data from the volatile memory.

2. The apparatus of claim 1, wherein for the transition from the first power state to the second power state the controller is further configured to cause the apparatus to:
disable at least a first power supply and a second power supply associated with the memory system.

3. The apparatus of claim 1, wherein for the transition from the first power state to the second power state the controller is further configured to cause the apparatus to:
disable at least a first power supply associated with the memory system.

4. The apparatus of claim 1, wherein the controller is further configured to cause the apparatus to:
update the trim settings of the memory system using the first set of data in accordance with reading the copied first set of data from the volatile memory or the flushed first set of data from the non-volatile memory.

5. The apparatus of claim 1, wherein the controller is further configured to cause the apparatus to:
perform, for a first duration, one or more operations after receiving the first command, wherein copying the first set of data to the volatile memory occurs during a second duration after the first duration.

6. The apparatus of claim 1, wherein the controller is further configured to cause the apparatus to:
receive a second command indicating a transition from the second power state to the first power state; and
transition from the second power state to the first power state in response to receiving the second command, wherein attempting to read the first set of data is in response to transitioning from the second power state to the first power state.

7. The apparatus of claim 1, wherein the trim settings of the memory system comprise at least one or more mapping tables, one or more changelogs, one or more sets of parity bits, or a combination thereof.

8. A non-transitory computer-readable medium storing code comprising instructions which, when executed by a processor of an electronic device, cause the electronic device to:

receive, at a memory system comprising a volatile memory and a non-volatile memory, a first command indicating a transition of the volatile memory and the non-volatile memory from a first power state to a second power state, wherein the second power state is lower than the first power state and lower than a third power state;

copy, to the volatile memory and in response to receiving the first command, a first set of data that is stored at the memory system and associated with trim settings of the memory system;

flush the first set of data from the volatile memory to the non-volatile memory in response to copying the first set of data to the volatile memory;

transition, by the memory system, the volatile memory and the non-volatile memory from the first power state to the second power state in response to flushing the first set of data from the volatile memory to the non-volatile memory and suspending the memory system;

transition, by the memory system, the volatile memory and the non-volatile memory from the second power state to the first power state after transitioning the volatile memory and the non-volatile memory from the first power state to the second power state;

attempt to read the first set of data associated with the trim settings of the memory system from the volatile memory after transitioning the volatile memory and the non-volatile memory from the second power state to the first power state and before reading the first set of data from the non-volatile memory; and read the first set of data from the non-volatile memory in response to the memory system transitioning the volatile memory and the non-volatile memory from the second power state to the first power state and attempting to read the first set of data from the volatile memory.

9. The non-transitory computer-readable medium of claim 8, wherein the instructions to transition from the first power state to the second power state, when executed by the processor of the electronic device, further cause the electronic device to:

disable, by the memory system, at least a first power supply and a second power supply associated with the memory system.

10. The non-transitory computer-readable medium of claim 8, wherein the instructions to transition from the first power state to the second power state, when executed by the processor of the electronic device, further cause the electronic device to:

disable, by the memory system, at least a first power supply associated with the memory system.

11. The non-transitory computer-readable medium of claim 8, wherein the instructions, when executed by the processor of the electronic device, further cause the electronic device to:

update the trim settings of the memory system using the first set of data in accordance with reading the copied first set of data from the volatile memory or the flushed first set of data from the non-volatile memory.

12. The non-transitory computer-readable medium of claim 8, wherein the instructions, when executed by the processor of the electronic device, further cause the electronic device to:

perform, for a first duration, one or more operations at the memory system after receiving the first command, wherein copying the first set of data to the volatile memory occurs during a second duration after the first duration.

13. The non-transitory computer-readable medium of claim 8, wherein the instructions, when executed by the processor of the electronic device, further cause the electronic device to:

receive, from the memory system, a second command indicating a transition from the second power state to the first power state; and transition, by the memory system, from the second power state to the first power state in response to receiving the second command, wherein attempting to read the first set of data is in response to the memory system transitioning from the second power state to the first power state.

14. The non-transitory computer-readable medium of claim 8, wherein the trim settings of the memory system comprise at least one or more mapping tables, one or more changelogs, one or more sets of parity bits, or a combination thereof.

15. A method, comprising:

receiving, at a memory system comprising a volatile memory and a non-volatile memory, a first command indicating a transition of the volatile memory and the non-volatile memory from a first power state to a second power state, wherein the second power state is lower than the first power state and lower than a third power state;

copying, to the volatile memory and in response to receiving the first command, a first set of data that is stored at the memory system and associated with trim settings of the memory system;

flushing the first set of data from the volatile memory to the non-volatile memory in response to copying the first set of data to the volatile memory;

transitioning, by the memory system, the volatile memory and the non-volatile memory from the first power state to the second power state in response to flushing the first set of data from the volatile memory to the non-volatile memory and suspending the memory system;

transitioning, by the memory system, the volatile memory and the non-volatile memory from the second power state to the first power state after transitioning the volatile memory and the non-volatile memory from the first power state to the second power state;

attempting to read the first set of data associated with the trim settings of the memory system from the volatile memory after transitioning the volatile memory and the non-volatile memory from the second power state to the first power state and before reading the first set of data from the non-volatile memory; and reading the first set of data from the non-volatile memory in response to the memory system transitioning the volatile memory and the non-volatile memory from the second power state to the first power state and attempting to read the first set of data from the volatile memory.

16. The method of claim 15, wherein transitioning from the first power state to the second power state comprises:

disabling, by the memory system, at least a first power supply and a second power supply associated with the memory system.

* * * * *